Sept. 1, 1964     J. G. PESSINA     3,146,523
METHOD FOR REPAIRING A WORN FACING
Filed Sept. 7, 1962
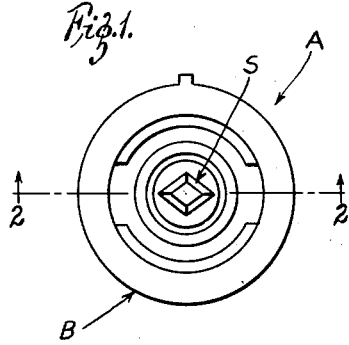
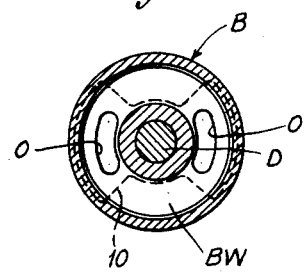
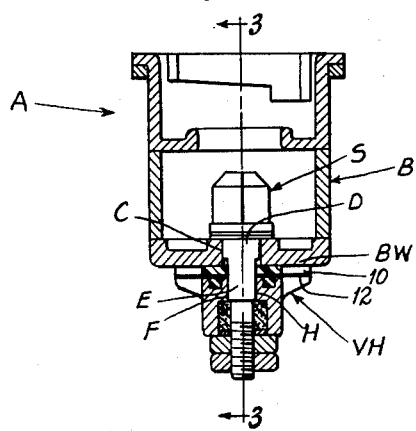
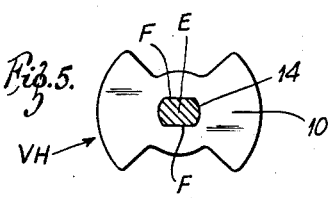
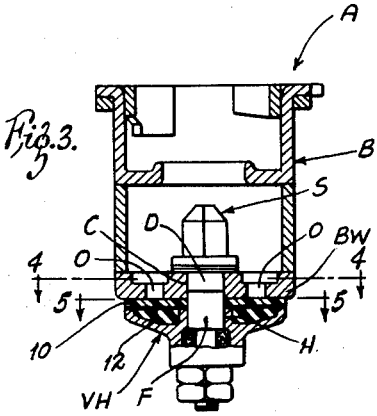
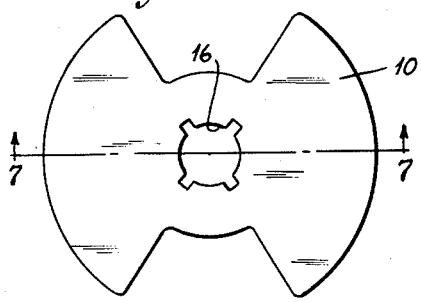
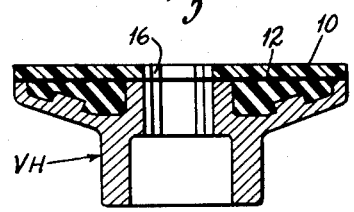
INVENTOR:
JOSEPH G. PESSINA,
BY George J Mager
HIS ATTORNEY 3,146,523
METHOD FOR REPAIRING A WORN FACING
Joseph G. Pessina, 1024 N. 1st St., St. Louis, Mo.
Filed Sept. 7, 1962, Ser. No. 222,134
1 Claim. (Cl. 29—401)

The present invention relates in general to a method for repairing valves, and more particularly to valves of the type known as lager valves that are adapted for use in association with beer containers. Such valves serve to seal the containers until they are tapped, and to exclude extraneous matter from the containers after the beer contents thereof have been dispensed.

Although there are others, most of the lager valves currently in use are similar to those disclosed in United States Patents Nos. 2,262,928 and 2,262,929, both granted on November 18, 1941.

The present invention is particularly directed to the provision of an improved valve head facing, and to a method for repairing facings of present valve head structures that have become worn from repeated use.

As explained in the specifications of the patents aforesaid, valve heads of the type under consideration include a facing arranged in close contact with the lower face of the valve body bottom wall. Said bottom wall has formed therein a pair of oppositely disposed arcuate valve openings through which the beer passes from the container when the valve, in use, is in open status. When the valve is in closed status, the facing of the valve head overlies said openings, so that as should be apparent, a valve head rotation of ninety degress in one direction will cover the arcuate dispensing openings aforesaid, whereas a similar rotation in the opposite direction will uncover them.

As a general rule, the facings aforesaid have heretofore been formed of hard rubber. In consequence of repeated closed to open status and vice versa rotations of the valve head, these facings gradually deteriorate in effectiveness to the point that, sooner or later, they do not provide a positive seal for the valve in closed status.

Prior to this invention, it had been normal procedure to simply discard the sworn or ineffective valve head, or to repair the head by first removing the worn facing therefrom, and thereafter replacing it with a new one. As heretofore practiced, such repairs had required the application of heat to the valve head so that the hard rubber facing and the depending body thereof could be extracted, inserting the new facing and its depending body, subjecting the resultant assembly to a molding process, and so on. From the standpoint of economy however, such procedure had proven to be so expensive that the beer brewing industry has for a long time been seeking a solution of this problem.

Accordingly, the primary objective of the present invention is twofold. That is to say, this invention contemplates an improved facing for valve heads of the character under consideration, and a method for applying such facings to valve heads that are already existent, but which are no longer effective because the sealing facings thereof are worn out.

Wherefore, this invention contemplates valve facings that are formed of virgin Teflon material, this material being a plastic that is inherently tough, tasteless, odorless, and particularly unaffected by the ingredients found in various brands of beer.

With respect to valve heads in need of repair because they have lost their efficiency, the present invention prescribes a novel method for not only restoring them to their original efficiency, but for furthermore rendering them more efficient in future usage, as will appear.

The invention is illustrated on a sheet of drawings that accompanies this specification, and a more comprehensive understanding of its features and advantages may be had from the description that follows with reference to said drawings, wherein:

FIGURE 1 is a plan view of a typical lager valve;
FIGURE 2 is a vertical sectional view taken on the line 2—2 of FIGURE 1;
FIGURE 3 is a vertical sectional view taken on the line 3—3 of FIGURE 2;
FIGURE 4 is a horizontal sectional view taken on the line 4—4 of FIGURE 3;
FIGURE 5 is a horizontal sectional view taken on the line 5—5 of FIGURE 3;
FIGURE 6 is an enlarged detail plan view of a slightly modified type of valve head, having the facing of the present invention embodied therein; and
FIGURE 7 is a vertical sectional view taken on the line 7—7 of FIGURE 6.

Inasmuch as the present invention is not concerned with the construction of the valve itself and lays no claim thereto, it will be but briefly described. Thus the exemplary valve A is shown to include a valve body B having a bottom wall BW. A centrally located opening C, and a pair of oppositely disposed arcuate valve openings O, are formed in the bottom wall BW. A circular portion D of the polygonally headed valve stem S is rotatable in the opening C, and the valve openings O serve as passageways through which beer passes when the valve, in use, is in the open status. Immediately below the circular portion D thereof, the illustrated valve stem S has an integral portion E provided with opposed flat faces F, that give to said value stem portion an elongated, non-circular cross-sectional shape, as seen to best advantage in FIGURE 5.

Mounted on the valve stem S is a valve head VH of the configuration shown and described in the patents aforesaid. Said head includes a central portion from which flared portions extend outwardly in opposite directions. The valve head is provided with a centrally located, non-circular opening H, that corresponds in shape and size with the cross-section of the portion E of the valve stem S, said section E extending through the opening H. Consequently as should be apparent, rotary movements of the valve stem will effect corresponding movements of the valve head.

As described and illustrated in the patents aforesaid, the valve head structure is surmounted by a facing that is so arranged that the top face thereof is in close contact with the lower face of the valve body bottom wall B, and it is to such elements in valves of this type, that the instant invention is directed.

In accordance with the teachings of the present invention, this facing which actually is of butterfly contour (although not so described in the patent specifications under consideration), would be comprised of virgin Teflon material (polytetrafluoroethylene), and would be bonded to the upper face of the valve head structure by means of a thin layer of epoxy resin, as will appear.

For purposes of identification in the drawings, the Teflon facing of the present invention is designated by the numeral 10, and the thin layer of epoxy resin bonding material is designated 12.

In cases where the facing 10 would be integrated with a valve head that is associated with an operating stem S which includes an integral portion E provided with flat faces F as in FIGURE 5, said facing would be provided with a correspondingly contoured central opening 14.

In cases where the facing 10 would be integrated with a valve head that is associated with an operating stem S which includes an integral portion E provided with splines (not illustrated), said facing would be provided with a correspondingly contoured central opening 16.

In cases where the facing 10 would be integrated with a valve head that is associated with an operating stem S which includes an integral portion such as E but of polygonal cross-section, said facing would be provided with a correspondingly contoured central opening.

Inasmuch as the paramount objective is directed to the repair of valve heads that have become defective on account of wear of their facings, it is believed that the description which follows will suffice for a completely comprehensive understanding of all the aspects of the present invention.

In other words, with attention directed for example to the facing designated by the numeral 31 in Patent Nos. 2,262,928 and 2,262,929, it will be assumed that such facing has been worn to ineffective condition. Prior to this invention, it had been customary to discard the entire valve head assembly and replace it with a new one, or in the alternative, to repair said assembly as hereinabove explained.

In accordance with the concepts of the present invention, a method has been evolved whereby the mere substitution of a facing 10 for the worn facing will result in a valve head that will not only give a better performance than it did when it was new, but at the same time, will enable the salvage of the remaining structure of the valve head itself, and the elements associated therewith.

The Teflon material under consideration has a thickness of approximately one-sixteenth of an inch, and is commercially available in rolls or sheets. Assuming that the facings were to be made from sheet Teflon, one face of said sheet would be etched. That is to say, one face of the sheet would be almost imperceptibly roughened by a chemical process, so that it could be adhered to another surface by means of an appropriate adhesive substance interposed between said facing and other surface. It is noted however, that the present invention makes no claim to the etching process per se, nor to the adhesive substance formula.

From the etched Teflon sheet, a facing 10 would be stamped out, with the central opening therein being of course formed in correspondence with the non-circular contour of the section E on the valve stem incorporated in the particular valve head to be repaired.

The worn facing would be removed from the valve head by grinding, thus presenting the planar though slightly roughened upper surface of the valve head structure. In order to extract all moisture therefrom, the thus treated valve head would be subjected to heat for approximately one hour, at a temperature of about one hundred and fifty degrees Fahrenheit.

Thereupon a layer of epoxy resin having a thickness of approximately two thousandths of an inch, would be applied to the ground upper surface of the valve head. Then the Teflon facing 10 would be deposited thereonto with its etched face downward, and its non-circular central opening and its peripheral contour in exact alignment or conformity with corresponding contours of the valve head.

The resulting valve assembly would then be subjected to an applied pressure of approximately 100 p.s.i. for about one hour, during which time the epoxy resin would harden, and positively bond the facing 10 to the valve head VH.

In view of the foregoing description and the drawings, it is believed that an adequate disclosure of the instant invention has been presented. Obviously, after a defective valve head has been repaired in accordance with the method taught, it would be remounted on the old valve stem and assembled onto the valve body B in the normal manner as is understood.

It will of course be readily apparent that some of the earlier steps of the method taught herein may vary in sequence from that described, particularly when (as is usually the case), a considerable quantity of valve heads are being concurrently repaired. Wherefore, it is to be understood that the method concept of this invention is not to be limited to the precise sequence of steps described and set forth in the claim hereunto appended.

What I claim is:

In a method for repairing the valve head of a lager valve of the type disclosed, said head having a planar upper surface surmounted by a facing formed of rubber or like material that had become worn account repeated use, said facing having a central non-circular opening therein, the steps which comprise:

etching one face of a sheet of virgin Teflon material having a thickness of approximately one sixteenth of an inch;

stamping from said sheet a facing contoured in conformity with the worn facing and having a corresponding non-circular central opening therein;

removing the worn facing from the valve head by a grinding operation, thus presenting the planar though slightly roughened upper surface of the valve head;

subjecting the thus treated valve head to heat at a temperature of about one hundred and fifty degrees Fahrenheit for approximately one hour thus extracting all moisture therefrom;

applying a layer of epoxy resin having a thickness of approximately two thousandths of an inch to the slightly roughened upper surface aforesaid of the valve head;

thereupon depositing the stamped facing onto the valve head with its etched face downward, and its non-circular central opening and its peripheral contour in exact alignment or conformity with the corresponding contours of the valve head; and then subjecting the resulting valve head assembly to an applied pressure of approximately 100 p.s.i. for about one hour.

References Cited in the file of this patent

UNITED STATES PATENTS

| | | |
|---|---|---|
| 2,262,928 | Fausek | Nov. 18, 1941 |
| 2,262,929 | Fausek | Nov. 18, 1941 |
| 2,856,679 | Burkhardt | Oct. 21, 1958 |
| 2,984,895 | Griffin | May 23, 1961 |